United States Patent
Li et al.

(10) Patent No.: US 11,981,612 B2
(45) Date of Patent: May 14, 2024

(54) METHOD FOR OPTIMIZING PARTICLE SIZE OF CONTROLLED-RELEASE NITROGEN FERTILIZER OXAMIDE PARTICLES FOR SINGLE BASAL FERTILIZATION

(71) Applicant: INSTITUTE OF SOIL SCIENCE, CHINESE ACADEMY OF SCIENCES, Jiangsu (CN)

(72) Inventors: Xun Li, Jiangsu (CN); Zengqiang Duan, Jiangsu (CN); Chunwu Zhu, Jiangsu (CN)

(73) Assignee: INSTITUTE OF SOIL SCIENCE, CHINESE ACADEMY OF SCIENCES, Jiangsu (CN)

( * ) Notice: Subject to any disclaimer, the term of this patent is extended or adjusted under 35 U.S.C. 154(b) by 123 days.

(21) Appl. No.: 17/739,222

(22) Filed: May 9, 2022

(65) Prior Publication Data

US 2022/0369543 A1 Nov. 24, 2022

Related U.S. Application Data

(63) Continuation of application No. PCT/CN2021/123205, filed on Oct. 12, 2021.

(30) Foreign Application Priority Data

May 20, 2021 (CN) .......................... 202110551541.3

(51) Int. Cl.
*C05G 5/10* (2020.01)
*C05C 11/00* (2006.01)

(52) U.S. Cl.
CPC ............... *C05G 5/10* (2020.02); *C05C 11/00* (2013.01)

(58) Field of Classification Search
CPC ................................. C05G 5/10; C05C 11/00
See application file for complete search history.

(56) References Cited

U.S. PATENT DOCUMENTS

2003/0051523 A1 3/2003 Tabei

FOREIGN PATENT DOCUMENTS

| | | |
|---|---|---|
| CN | 105936607 | 9/2016 |
| CN | 108012807 | 5/2018 |
| CN | 112028671 | 12/2020 |
| CN | 113243179 | 8/2021 |
| KR | 20110082763 | 7/2011 |

*Primary Examiner* — Monica A Shin
(74) *Attorney, Agent, or Firm* — JCIPRNET

(57) ABSTRACT

Disclosed is a method for optimizing a particle size of controlled-release nitrogen fertilizer oxamide particles for single basal fertilization, which comprises the following steps: measuring a pH value of the soil in a region; measuring an organic matter content OM of the soil, with a unit of $g \cdot kg^{-1}$; measuring a total nitrogen content TN of the soil, with a unit of $g \cdot kg^{-1}$; collecting an average temperature T at a 10 cm depth of the soil in a rice growing season in the region, with a unit of ° C.; and for a rice variety with a growth duration of D, with a unit of day, calculating a diameter of controlled-release nitrogen fertilizer oxamide particles for single basal fertilization that matches a nitrogen requirement in the rice growth duration by using a formula.

4 Claims, No Drawings

METHOD FOR OPTIMIZING PARTICLE SIZE OF CONTROLLED-RELEASE NITROGEN FERTILIZER OXAMIDE PARTICLES FOR SINGLE BASAL FERTILIZATION

CROSS-REFERENCE TO RELATED APPLICATION

This application is a continuation of international application of PCT application serial no. PCT/CN2021/123205 filed on Oct. 12, 2021, which claims the priority benefit of China application no. 202110551541.3, filed on May 20, 2021. The entirety of each of the above mentioned patent applications is hereby incorporated by reference herein and made a part of this specification.

BACKGROUND

Technical Field

The present invention belongs to the technical field of soil science, fertilizer science and plant nutrition science, and particularly relates to a method for optimizing a particle size of controlled-release nitrogen fertilizer oxamide particles, which is especially applicable to the soil properties, climatic conditions and rice growth durations in different rice producing areas.

Rice is one of the most important food crops in the world, and more than half of the global population takes rice as staple food. However, the nitrogen use efficiency of rice is still no more than 50%, which is mainly attributed to a high loss rate of quick-acting nitrogen fertilizers currently used for rice growth through various ways such as surface runoff, leaching, ammonia volatilization and nitrous oxide emission; and meanwhile the agricultural non-point source pollution is worsened. In addition, repeated topdressing in the rice growing season requires much manual labor, which increases the production cost and is also a bottleneck restricting whole-process mechanized planting of rice. The use of controlled-release nitrogen fertilizers in rice production can control the nitrogen release rate to coordinate with the rice requirement, thereby reducing nitrogen loss and relieving environmental pollution; and single basal fertilization is applicable to mechanized production, and thus greatly saves the labor cost.

Among numerous controlled-release nitrogen fertilizers, oxamide (($CONH_2)_2$) has a broad application prospect. It is a good controlled-release nitrogen fertilizer containing 31.8% of nitrogen, does not absorb moisture in air and is nontoxic, easy to store and slightly soluble in water, with a solubility of only 4 $g·L^{-1}$ in water at 25° C. After being dissolved in water, oxamide gradually releases ammonium nitrogen through slow hydrolysis and decomposition by soil microorganisms, and can provide nitrogen nutrients for rice growth. The controlled-release effect of oxamide, as a good controlled-release nitrogen fertilizer for single basal fertilization in paddy field, has been proved by some experiments in Japan and Taiwan region of China.

Currently available studies indicate that the nitrogen release period will be prolonged with the increase of oxamide particle size. However, the paddy soil in the rice planting areas have different physical, chemical and biological properties, so the oxamide particles with the same size inevitably have a great difference in the nitrogen release rate in different paddy soil. And the key soil properties which mainly affect the nitrogen release process of oxamide particles are unknown. Moreover, once the nitrogen release rate is too fast, inadequate supply of nitrogen will happen in the late growth period of rice, thereby severely affecting the rice yield. On the contrary, if the nitrogen release rate is too slow, excessive supply of nitrogen will be caused in the late growth period of rice, thereby leading to unfavorable-delayed senescence and lodging and reducing the rice yield. And the redundant fertilizer is not only a waste of resources, but also will cause a negative impact on the environment. Therefore, it is necessary to conduct intensive studies on which soil properties have the highest parameter correlation with the nitrogen release rate of the oxamide particles. In addition, main rice producing areas have sharply different climatic characteristics, and different rice varieties are also quite different in growth period and fertilizer requirement period. Therefore, in view of the soil properties and climatic conditions of different rice planting areas, a large number of experiments are necessary for exploration and optimization to optimize the particle size of oxamide particles for single basal fertilization so that the nitrogen release period thereof matches the growth period of rice in a corresponding region.

SUMMARY

Technical problems to be solved: Through lots of experiments for correlation analysis and verification, the present invention finds out main soil properties and climatic conditions affecting the nitrogen release rate of oxamide particles, and puts forward a method for optimizing a particle size of controlled-release nitrogen fertilizer oxamide particles, which is applicable to the soil properties and climatic conditions of different rice producing areas and matches the rice growth periods of corresponding regions.

Technical solutions: A method for optimizing a particle size of controlled-release nitrogen fertilizer oxamide particles for single basal fertilization, comprising the following steps: measuring a pH value of the soil in a region; measuring an organic matter content of the soil, with a unit of $g·kg^{-1}$; measuring a total nitrogen content of the soil, with a unit of $g·kg^{-1}$; collecting an average temperature at a 10 cm depth of the soil in a rice growing season in the region, with a unit of ° C.; and for a rice variety with a growth duration, with a unit of day, calculating a diameter (mm) of controlled-release nitrogen fertilizer oxamide particles for single basal fertilization that matches a nitrogen requirement in the rice growth duration by using $d=a \times T^b \times pH^c \times OM^f \times TN^g \times D^i$, wherein pH is the pH value of the paddy soil in the region, OM is the organic matter content of the paddy soil, TN is the total nitrogen content of the paddy soil, T is the average temperature at the 10 cm depth of the paddy soil in the rice growing season in the region, D is the growth duration of the rice variety, and a, b, c, f, g and i are parameters obtained by correlation analysis and multivariable non-linear regression fitting of experimental data.

Preferably, in paddy soil having a pH value of 4-9, an organic matter content OM of 5-50 $g·kg^{-1}$ and a total nitrogen content TN of 0.3-3 $g·kg^{-1}$ as well as an average temperature T of 10-35° C. at a 10 cm depth of the soil in a rice growing season, and for a rice variety having a growth duration of 60-160 days, the diameter d (mm) of controlled-release nitrogen fertilizer oxamide particles for single basal fertilization that matches a nitrogen requirement in the rice growth duration is calculated using $d=2.34 \times 10^{-6} \times T^{1.282} \times pH^{1.732} \times OM^{0.677} \times TN^{-0.311} \times D^{1.091}$.

Preferably, the controlled-release nitrogen fertilizer oxamide particles used are spherical particles, having a density of 1.1-1.3 $g·cm^{-3}$ and a particle hardness of 25-50 N.

The number of days of the rice growth duration is a total number of days from the day when rice seedlings are transplanted into a paddy field to the day of harvest, or from the day when rice seeds are sown into a paddy field to the day of harvest; and the controlled-release nitrogen fertilizer oxamide particles are applied to the paddy field on the same day when the rice seedlings are transplanted into the paddy field or when the rice seeds are sown into the paddy field.

Use of the optimizing method in rice producing areas of China.

Beneficial effects: The diameter of controlled-release nitrogen fertilizer oxamide particles for single basal fertilization that matches a nitrogen requirement of the rice variety with a specific growth duration can be calculated by using the formula in the technical method of the present invention simply by obtaining four parameters: the pH value, soil organic matter content and total nitrogen content as well as the average temperature at a 10 cm depth of the soil during a rice growing season in the region. Indoor incubation experiments further verify that, for oxamide particles having a particle size closest to the calculated value, the time required for releasing 90% of nitrogen under the soil properties and temperature conditions best matches the growth duration of a target rice variety. It can thus be proved that the nitrogen release period of oxamide particles having a specific particle size optimized by the technical method of the present invention best matches the rice growth duration of a target rice producing area, thereby achieving the best economic benefits and environmental benefits of controlled-release nitrogen fertilizer oxamide particles in single basal fertilization in rice production.

DESCRIPTION OF THE EMBODIMENTS

The present invention is further described in detail below by way of specific embodiments, but the scope of the present invention is not limited in any manner. Unless otherwise specifically stated, the techniques used in the present invention are all conventional techniques.

Example 1

Somewhere in Hailun, Heilongjiang, paddy soil has a pH value=6.35, an organic matter content OM=34.2 g·kg$^{-1}$ and a total nitrogen content TN=2.02 g·kg$^{-1}$, an average temperature T=15.6° C. at a 10 cm depth of the soil in a rice growing season in the region, and a total number of days D=125 days from transplanting of rice seedlings to harvest. The diameter of controlled-release nitrogen fertilizer oxamide particles suitable for rice growth in the region could be calculated as 3.32 mm by using the formula $d=2.34\times10^{-6}\times T^{1.282}\times pH^{1.732}\times OM^{0.677}\times TN^{0.311}\times D^{1.091}$ in the technical method of the present invention. The paddy soil in the region was collected, oxamide particles having a density of 1.145 g·cm$^{-3}$ and a particle hardness of 32 N were selected and were mixed with the soil in an addition amount of 150 mg of nitrogen per kilogram of air-dried soil in a culture pot, and then the mixture was subjected to waterlogged incubation in an incubator without light while an incubation temperature was kept at 15.6° C. The incubation results show that, the total numbers of days of the oxamide particles having a particle size of 3.0±0.1 mm and a particle size of 3.5±0.1 mm achieving a nitrogen release of 90% are 116 days and 133 days from the day of incubation, respectively. It proves that the nitrogen release period of the oxamide particles having an optimized diameter of 3.32 mm obtained by the formula in the technical method of the present invention can match the rice requirement in the growth period of 125 days in the region.

Example 2

Somewhere in Panjin, Liaoning, paddy soil has a pH value=7.30, an organic matter content OM=23.5 g·kg$^{-1}$ and a total nitrogen content TN=1.72 g·kg$^{-1}$, an average temperature T=18.9° C. at a 10 cm depth of the soil in a rice growing season in the region, and a total number of days D=120 days from transplanting of rice seedlings to harvest. The diameter of controlled-release nitrogen fertilizer oxamide particles suitable for rice growth in the region could be calculated as 4.21 mm by using the formula $d=2.34\times10^{-6}\times T^{1.282}\times pH^{1.732}\times OM^{0.677}\times TN^{0.311}\times D^{1.091}$ in the technical method of the present invention. The paddy soil in the region was collected, oxamide particles having a density of 1.145 g·cm$^{-3}$ and a particle hardness of 32 N were selected and were mixed with the soil in an addition amount of 150 mg of nitrogen per kilogram of air-dried soil in a culture pot, and then the mixture was subjected to waterlogged incubation in an incubator without light while an incubation temperature was kept at 18.9° C. The incubation results show that, the total numbers of days of the oxamide particles having a particle size of 4.0±40.1 mm and a particle size of 4.5±0.1 mm achieving a nitrogen release of 90% are 112 days and 125 days from the day of incubation, respectively. It proves that the nitrogen release period of the oxamide particles having an optimized diameter of 4.21 mm obtained by the formula in the technical method of the present invention can match the rice requirement in the growth period of 120 days in the region.

Example 3

Somewhere in Taicang, Jiangsu, paddy soil has a pH value=8.08, an organic matter content OM=15.1 g·kg$^{-1}$ and a total nitrogen content TN=1.43 g·kg$^{-1}$, an average temperature T=24.9° C. at a 10 cm depth of the soil in a rice growing season in the region, and a total number of days D=115 days from transplanting of rice seedlings to harvest. The diameter of controlled-release nitrogen fertilizer oxamide particles suitable for rice growth in the region could be calculated as 5.36 mm by using the formula $d=2.34\times10^{-6}\times T^{1.282}\times pH^{1.732}\times OM^{0.677}\times TN^{0.311}\times D^{1.091}$ in the technical method of the present invention. The paddy soil in the region was collected, oxamide particles having a density of 1.133 g·cm$^{-3}$ and a particle hardness of 28 N were selected and were mixed with the soil in an addition amount of 150 mg of nitrogen per kilogram of air-dried soil in a culture pot, and then the mixture was subjected to waterlogged incubation in an incubator without light while an incubation temperature was kept at 24.9° C. The incubation results show that, the total numbers of days of the oxamide particles having a particle size of 5.0±0.1 mm and a particle size of 5.5±0.1 mm achieving a nitrogen release of 90% are 108 days and 118 days from the day of incubation, respectively. It proves that the nitrogen release period of the oxamide particles having an optimized diameter of 5.36 mm obtained by the formula in the technical method of the present invention can match the rice requirement in the growth period of 115 days in the region.

Example 4

Somewhere in Livan, Anhui, paddy soil has a pH value=5.91, an organic matter content OM=11.2 g·kg$^{-1}$ and a total nitrogen content TN=1.29 g·kg$^{-1}$, an average temperature T=25.1° C. at a 10 cm depth of the soil in a rice growing season in the region, and a total number of days D=105 days from transplanting of rice seedlings to harvest. The diameter of controlled-release nitrogen fertilizer oxamide particles suitable for rice growth in the region could be calculated as 2.41 mm by using the formula d=2.34×10$^{-6}$×T$^{1.282}$×pH$^{1.732}$×OM$^{0.677}$×TN$^{-0.311}$×D$^{1.091}$ in the technical method of the present invention. The paddy soil in the region was collected, oxamide particles having a density of 1.172 g·cm$^{-3}$ and a particle hardness of 35 N were selected and were mixed with the soil in an addition amount of 150 mg of nitrogen per kilogram of air-dried soil in a culture pot, and then the mixture was subjected to waterlogged incubation in an incubator without light while an incubation temperature was kept at 25.1° C. The incubation results show that, the total numbers of days of the oxamide particles having a particle size of 2.0±0.1 mm and a particle size of 2.5±0.1 mm achieving a nitrogen release of 90% are 86 days and 107 days from the day of incubation, respectively. It proves that the nitrogen release period of the oxamide particles having an optimized diameter of 2.41 mm obtained by the formula in the technical method of the present invention can match the rice requirement in the growth period of 105 days in the region.

Example 5

Somewhere in Yingtan, Jiangxi, paddy soil has a pH value=6.26, an organic matter content OM=10.8 g·kg$^{-1}$ and a total nitrogen content TN=1.01 g·kg$^{-1}$, an average temperature T=24.8° C. at a 10 cm depth of the soil in an early rice growing season in the region, a total number of days D=71 days from transplanting of early rice seedlings to harvest, an average temperature T=24.4° C. at a 10 cm depth of the soil in a late rice growing season, and a total number of days D=90 days from transplanting of late rice seedlings to harvest. Diameters of controlled-release nitrogen fertilizer oxamide particles suitable for the growth of early rice and late rice in the region could be calculated as 1.80 mm and 2.28 mm respectively by using the formula d=2.34×10$^{-6}$×T$^{1.282}$×pH$^{1.732}$×OM$^{0.677}$×TN$^{--0.311}$×D$^{1.091}$ in the technical method of the present invention. The paddy soil in the region was collected, oxamide particles having a density of 1.172 g·cm$^{-3}$ and a particle hardness of 35 N were selected and were mixed with the soil in an addition amount of 150 mg of nitrogen per kilogram of air-dried soil in a culture pot, and then the mixture was subjected to waterlogged incubation in an incubator without light while an incubation temperature was kept at 24.8° C. and 24.4° C. respectively. The incubation results show that, when the incubation temperature is 24.8° C., the total numbers of days of the oxamide particles having a particle size of 1.5±0.1 mm and a particle size of 2.0±0.1 mm achieving a nitrogen release of 90% are 60 days and 78 days from the day of incubation, respectively. It proves that the nitrogen release period of the oxamide particles having an optimized diameter of 1.80 mm obtained by the formula in the technical method of the present invention can match the early rice requirement in the growth period of 71 days in the region. When the incubation temperature is 24.4° C., the total numbers of days of the oxamide particles having a particle size of 2.0±0.1 mm and a particle size of 2.5±0.1 mm achieving a nitrogen release of 90% are 80 days and 98 days from the day of incubation, respectively. It proves that the nitrogen release period of the oxamide particles having an optimized diameter of 2.28 mm obtained by the formula in the technical method of the present invention can match the late rice requirement in the growth period of 90 days in the region.

Example 6

Somewhere in Taoyan county, Hunan, paddy soil has a pH value=5.23, an organic matter content OM=21.1 g·kg$^{-1}$ and a total nitrogen content TN=1.78 g·kg$^{-1}$, an average temperature T=26.6° C. at a 10 cm depth of the soil in an early rice growing season in the region, a total number of days D=82 days from transplanting of early rice seedlings to harvest, an average temperature T=25.7° C. at a 10 cm depth of the soil in a late rice growing season, and a total number of days D=95 days from transplanting of late rice seedlings to harvest. Diameters of controlled-release nitrogen fertilizer oxamide particles suitable for the growth of early rice and late rice in the region could be calculated as 2.22 mm and 2.50 mm respectively by using the formula d=2.34×10$^{-6}$×T$^{1.282}$×pH$^{1.732}$OM$^{0.677}$×TN$^{-0.311}$×D$^{1.091}$ in the technical method of the present invention. The paddy soil in the region was collected, oxamide particles having a density of 1.172 g·cm$^3$ and a particle hardness of 35 N were selected and were mixed with the soil in an addition amount of 150 mg of nitrogen per kilogram of air-dried soil in a culture pot, and then the mixture was subjected to waterlogged incubation in an incubator without light while an incubation temperature was kept at 26.6° C. and 25.7° C. respectively. The incubation results show that, when the incubation temperature is 26.6° C., the total numbers of days of the oxamide particles having a particle size of 2.0±0.1 mm and a particle size of 2.5±0.1 mm achieving a nitrogen release of 90% are 73 days and 91 days from the day of incubation, respectively. It proves that the nitrogen release period of the oxamide particles having an optimized diameter of 2.22 mm obtained by the formula in the technical method of the present invention can match the early rice requirement in the growth period of 82 days in the region. When the incubation temperature is 25.7° C., the total number of days of the oxamide particles having a particle size of 2.5±0.1 mm achieving a nitrogen release of 90% is 96 days from the day of incubation. It proves that the nitrogen release period of the oxamide particles having an optimized diameter of 2.50 mm obtained by the formula in the technical method of the present invention can match the late rice requirement in the growth period of 95 days in the region.

Example 7

Somewhere in Chengdu, Sichuan, paddy soil has a pH value=7.79, an organic matter content OM=26.3 g·kg$^{-1}$ and a total nitrogen content TN=1.58 g·kg$^{-1}$, an average temperature T=23.9° C. at a 10 cm depth of the soil in a rice growing season in the region, and a total number of days D=110 days from transplanting of rice seedlings to harvest. The diameter of slow-release nitrogen fertilizer oxamide particles suitable for rice growth in the region could be calculated as 6.41 mm by using the formula d=2.34×10$^{-6}$×T$^{1.282}$×pH$^{1.732}$×OM$^{0.677}$×TN$^{31\ 0.311}$×D$^{1.091}$ in the technical method of the present invention. The paddy soil in the region was collected, oxamide particles having a density of 1.118 g·cm$^{-3}$ and a particle hardness of 27 N were selected and were mixed with the soil in an addition amount of 150 mg of nitrogen per kilogram of air-dried soil in a culture pot, and then the mixture was subjected to waterlogged incubation in an incubator without light while an incubation temperature was kept at 23.9° C. The incubation results show that, the total numbers of days of the oxamide particles having a particle size of 6.0±0.1 mm and a particle size of 6.5±0.1 mm achieving a nitrogen release of 90% are 102 days and 112 days from the day of incubation, respectively. It proves that the nitrogen release period of the oxamide particles having an optimized diameter of 6.41 mm obtained by the formula in the technical method of the present invention can match the rice requirement in the growth period of 110 days in the region.

Example 8

Somewhere in Guangzhou, Guangdong, paddy soil has a pH value=6.43, an organic matter content OM=22.8 g·kg$^{-1}$ and a total nitrogen content TN=1.20 g·kg$^{-1}$, an average temperature T=28.1° C. at a 10 cm depth of the soil in an early rice growing season in the region, a total number of days D=142 days from sowing of early rice seeds to harvest, an average temperature T=27.6° C. at a 10 cm depth of the soil in a late rice growing season, and a total number of days D=134 days from sowing of late rice seeds to harvest. Diameters of controlled-release nitrogen fertilizer oxamide particles suitable for the growth of early rice and late rice in the region could be calculated as 7.40 mm and 6.79 mm respectively by using the formula d=2.34×10$^{-6}$×T$^{1.282}$× pH$^{1.732}$×OM$^{0.677}$×TN$^{-0.311}$×D$^{1.091}$ in the technical method of the present invention. The paddy soil in the region was collected, oxamide particles having a density of 1.118 g·cm$^{-3}$ and a particle hardness of 27 N were selected and were mixed with the soil in an addition amount of 150 mg of nitrogen per kilogram of air-dried soil in a culture pot, and then the mixture was subjected to waterlogged incubation in an incubator without light while an incubation temperature was kept at 28.1° C. and 27.6° C. respectively. The incubation results show that, when the incubation temperature is 28.1° C., the total numbers of days of the oxamide particles having a particle size of 7.0±0.1 mm and a particle size of 7.5±0.1 mm achieving a nitrogen release of 90% are 134 days and 144 days from the day of incubation, respectively. It proves that the nitrogen release period of the oxamide particles having an optimized diameter of 7.40 mm obtained by the formula in the technical method of the present invention can match the early rice requirement in the growth period of 142 days in the region. When the incubation temperature is 27.6° C., the total numbers of days of the oxamide particles having a particle size of 6.5±0.1 mm and a particle size of 7.0±0.1 mm achieving a nitrogen release of 90% are 128 days and 137 days from the day of incubation, respectively. It proves that the nitrogen release period of the oxamide particles having an optimized diameter of 6.79 mm obtained by the formula in the technical method of the present invention can match the late rice requirement in the growth period of 134 days in the region.

From the results of the examples in 8 provinces of China's main rice producing areas, the diameter of controlled-release nitrogen fertilizer oxamide particles for single basal fertilization that matches the nitrogen requirement in a rice growth duration in a corresponding region can be obtained by using the formula in the technical method of the present invention by simply measuring four parameters: the pH value, organic matter content and total nitrogen content of local paddy soil as well as the average temperature at a 10 cm depth of the soil in a rice growing season in the region. Indoor incubation experiments verify that, for oxamide particles having a particle size closest to the calculated value, the time required for releasing 90% of nitrogen under the soil properties and temperature conditions in the region best matches the growth duration of the target rice variety.

It can thus be proved that the nitrogen release period of oxamide particles having a specific particle size optimized by the technical method of the present invention best matches the rice growth duration of a target rice producing area, thereby achieving the best economic benefits and environmental benefits of controlled-release nitrogen fertilizer oxamide particles in single basal fertilization in rice production.

The above-mentioned technical solutions are merely preferred technical solutions of the present invention, and some possible modifications to some parts therein made by those skilled in the art all embody the principles of the present invention and belong to the scope of the present invention.

What is claimed is:

1. A method for optimizing the particle size of controlled-release nitrogen fertilizer oxamide particles for single basal fertilization in rice paddy soil having a pH value of 4-9, an organic matter content of 5-50 g·kg$^{-1}$, a total nitrogen content of 0.3-3 g·kg$^{-1}$, an average temperature of 10-35° C. at the 10 cm depth of the paddy soil in rice growing season, and for a rice variety having a growth duration of 60-160 days, comprising the following steps:
   measuring the pH value of paddy soil in a rice paddy field;
   measuring the organic matter content of the paddy soil, with a unit of g·kg$^{-1}$;
   measuring the total nitrogen content of the paddy soil, with a unit of g·kg$^{-1}$;
   collecting the average temperature at the 10 cm depth of the paddy soil in a rice growing season in the rice paddy field's region, with a unit of ° C.;
   for a rice variety with a growth duration, with a unit of day, calculating the diameter of the controlled-release nitrogen fertilizer oxamide particles for single basal fertilization by using d=2.34×10$^{6}$×T$^{1.282}$×pH$^{1.73}$×OM$^{0.677}$×TN$^{-0.311}$×D$^{1.091}$ with a unit of mm, wherein d is the diameter of the controlled-release nitrogen fertilizer oxamide particles, pH is the pH value of the paddy soil in the rice paddy field, OM is the organic matter content of the paddy soil, TN is the total nitrogen content of the paddy soil, T is the average temperature at the 10 cm depth of the paddy soil in the rice growing season in the rice paddy field's region, and D is the growth duration of the rice variety; and
   applying the controlled-release nitrogen fertilizer oxamide particles having the calculated diameter to the paddy field on the same day when rice seedlings are transplanted into the paddy field or when rice seeds are sown into the paddy field.

2. The method for optimizing the particle size of controlled-release nitrogen fertilizer oxamide particles for single basal fertilization according to claim 1, wherein the controlled-release nitrogen fertilizer oxamide particles used are spherical particles, having a density of 1.1-1.3 g·cm$^{-3}$ and a particle hardness of 25-50 N.

3. The method for optimizing the particle size of the controlled-release nitrogen fertilizer oxamide particles for single basal fertilization according to claim 1, wherein D is measured as the total number of days from the day when the rice seedlings are transplanted into the paddy field to the day of harvest, or from the day when the rice seeds are sown into the paddy field to the day of harvest.

4. The method for optimizing the particle size of the controlled-release nitrogen fertilizer oxamide particles for single basal fertilization according to claim 2, wherein D is measured as the total number of days from the day when the rice seedlings are transplanted into the paddy field to the day of harvest, or from the day when the rice seeds are sown into the paddy field to the day of harvest.

* * * * *